L. R. ST. JOHN.
COOKING UTENSIL.
APPLICATION FILED MAY 2, 1912.

1,080,861.

Patented Dec. 9, 1913.

WITNESSES:
F. C. Matheny
Frank Warren

INVENTOR
Lee Roy St. John
BY
C. D. Haskins
ATTORNEY

UNITED STATES PATENT OFFICE.

LEE ROY ST. JOHN, OF SEATTLE, WASHINGTON.

COOKING UTENSIL.

1,080,861.　　　　Specification of Letters Patent.　　Patented Dec. 9, 1913.

Application filed May 2, 1912. Serial No. 694,770.

*To all whom it may concern:*

Be it known that I, LEE ROY ST. JOHN, citizen of the United States, residing at Seattle, in the county of King and State of Washington, have invented a certain new and useful Improvement in Cooking Utensils, of which the following is a specification.

My invention relates to improvements in removable containers for kettles, stew-pans or other vessels, adapted for employment in the operation of boiling food products, and the object of my improvement is to provide a container made of wire-cloth or perforated sheet metal and having a suitable handle by which it may be removed with its contents from a boiling kettle by a person's bare hand and be emptied of such contents without burning such person's hand, and having such form and dimensions as will adapt it to be disposed within and rest upon the bottom of a kettle, or other vessel, within which food products may be boiled, so that its handle may project from such kettle at a point between the top edge of such kettle and a cover adapted to cover such kettle; and a further object of my improvement is to provide such a container as will prevent the solid food contents of a kettle from coming in contact with the bottom or the wall of such kettle whereby such contents may not be burned by reason of a lack of liquid, while if there be the normal amount of liquid within such kettle it may have access to the solid food contents through the perforations in such container. I attain these objects by devices illustrated in the accompanying drawings wherein—

Figure 1:
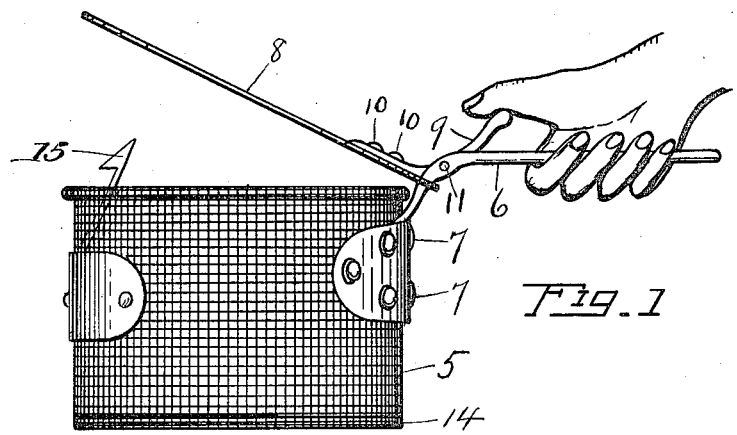
Figure 2:
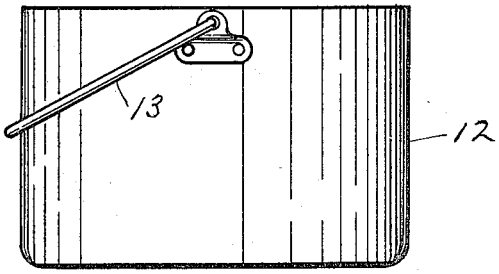
Figure 3:
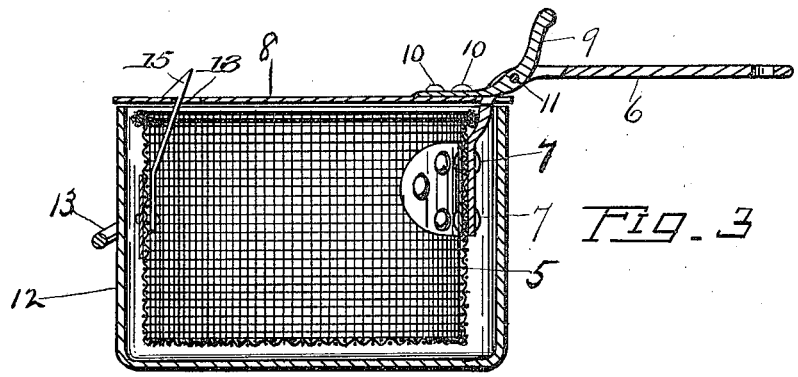

Figure 1 is a view in side elevation of a form of my invention as adapted to seat within and cover one form of kettle, Fig. 2 is a view in side elevation of a kettle of a form that adapts it to receive and be covered by the device illustrated in Fig 1, and Fig. 3 is a view in vertical section of the form of my device shown in Fig. 1 as it may be associated with the kettle shown in Fig. 2.

Like reference numbers indicate like parts throughout the drawings.

Referring to Fig. 1 of the drawings, 5 is a container of cylindrical form constructed of wire-cloth of suitable mesh to adapt it to retain a desired character of food product, and provided with a handle 6 which is secured thereto by rivets 7, and suitable reinforcing washers, not shown, so that it may extend radially from the cylindrical container 5 at a suitable elevation higher than the top edge of said container 5 whereby said container 5 may be removed from a kettle and its contents emptied without subjecting one's hand to radiant heat or steam.

A circular cover 8 may be hinged to the handle 6 at a point near the edge of the container 5 by an arm 9, to which the cover 8 is secured by rivets 10, a hinge-pin 11 being disposed to extend through the handle 6 and the arm 9; such cover 8 being enough larger in diameter than the kettle to be lined to adapt it to cover such kettle when the container 5 is placed therein.

The arm 9 may be extended upwardly at an angle so that a pressure by one's thumb, as indicated in Fig. 1, may serve to raise the cover 8 when desired to do so for any reason.

Fig. 2 shows by a view in side elevation a kettle 12 provided with a well known form of bail 13 which is attached thereto in a manner well known, which kettle 12 is of a form and size to receive within it, and be covered by, the structure illustrated in Fig. 1.

A kettle embodying my invention is particularly well adapted for cooking rice or other food products that are apt to burn if not closely watched.

In utilizing a kettle 12 embodying my invention a suitable quantity of water is placed in the kettle 12 and the desired food product is disposed within the removable receptacle constituting the container 5 and thereupon the cover 8 is allowed to close, then the container 5 is disposed within the kettle 12.

A latch-hook 15 is flexibly secured to the container 5 at the point on the inside thereof opposite its handle 6, where it is adapted to project upwardly above the top edge of said container 5 and through a hole 18 disposed in the cover 8 when such cover 8 is in a closed position, whereby such latch-hook 15 may engage with the top side of said cover 8 to secure such cover 8 in such closed position, said cover 8 being hinged to the handle 6 by the pivot pin 11 as hereinbefore described in the device of Fig. 1.

It will be observed that the cover 8 is larger in diameter than the diameter of the kettle within which it is suspended, whereby when the container 5 is suspended by its cover 8 within a larger kettle, then the bottom of the container 5 may be wholly free from contact with the bottom of such kettle, thus, when the latch-hook 15 is embodied with other features of my invention a container with a suitably larger cover may be applied to kettles of different sizes.

I am aware that perforated vessels and vessels of wire-cloth have been suspended in open topped kettles whereby food products, like sliced potatoes and doughnuts, have been cooked and I am also aware that a perforated plate or disk has been placed in the bottom of a kettle to prevent food product from coming in contact with the bottom of such kettle, such plate or disk being slightly raised from the bottom of such kettle by projections disposed on its under side but such devices do not contain my invention nor do they have the same mode of operation and utility that my invention has. While I have shown only one form of my invention it is obvious that modifications in form of construction may be made without departing from the spirit of my invention.

What I claim is:

A cooking utensil comprising a receptacle, a foraminous container adapted for reception therein, an upwardly bent handle upon said container, a cover pivoted to said handle above the top edge of said container, means upon said container for retaining the cover in closed position thereon, said cover being of greater diameter than the receptacle and adapted to position the container above the bottom of the latter when closed and positioned therein.

In witness whereof, I hereunto subscribe my name this seventeenth day of April A. D., 1912.

LEE ROY ST. JOHN.

Witnesses:
 FRANK WARREN,
 R. L. ROCKWELL.

Copies of this patent may be obtained for five cents each, by addressing the "Commissioner of Patents, Washington, D. C."